A. G. FRANCE.
ADVERTISING DEVICE.
APPLICATION FILED DEC. 17, 1910.
1,008,594.
Patented Nov. 14, 1911.
2 SHEETS—SHEET 1.
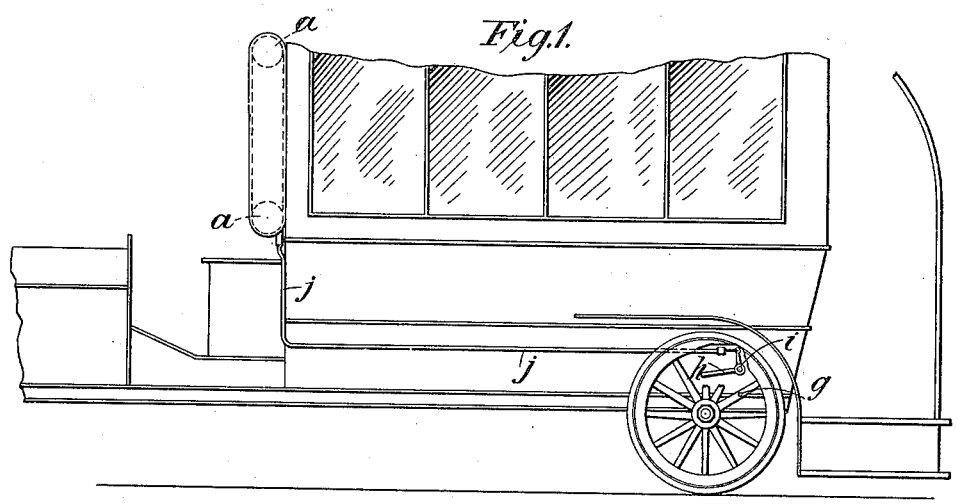
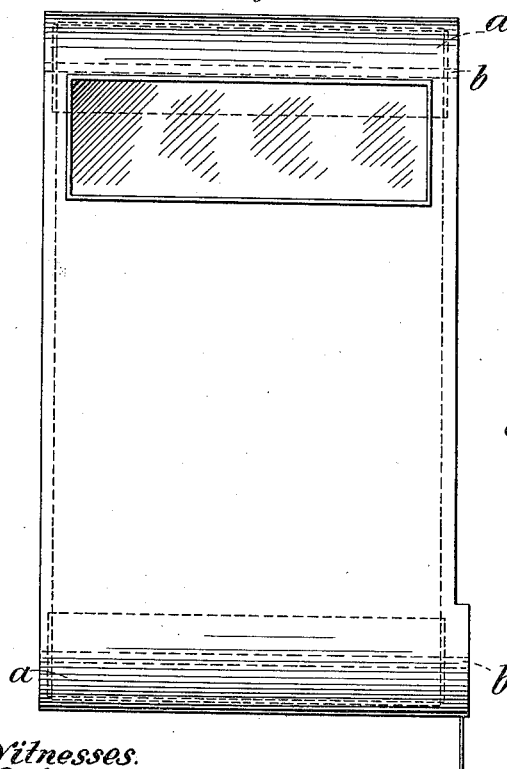
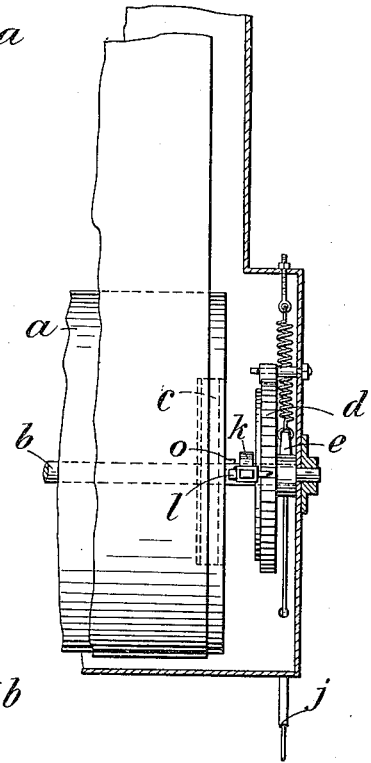
Witnesses.
E. B. Corcoran
Harry S. Corcoran
Inventor:
Arthur G. France,
by Herbert W. S. Jenner,
Attorney.

A. G. FRANCE.
ADVERTISING DEVICE.
APPLICATION FILED DEC. 17, 1910.
1,008,594.
Patented Nov. 14, 1911.
2 SHEETS—SHEET 2.
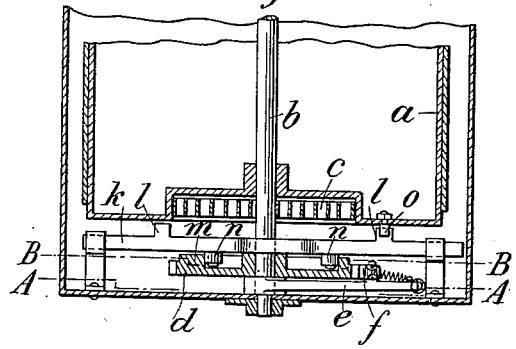
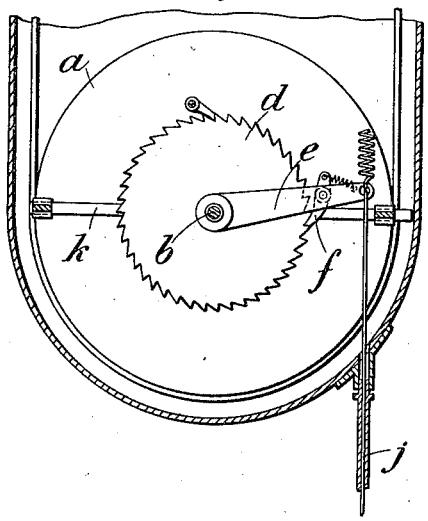
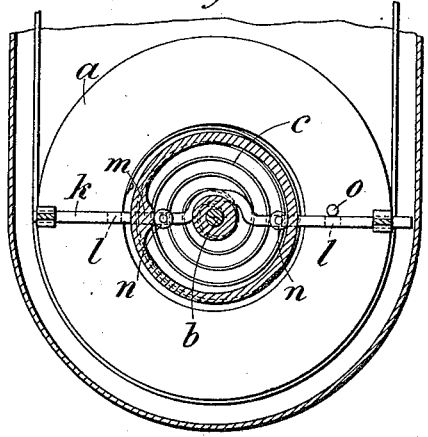
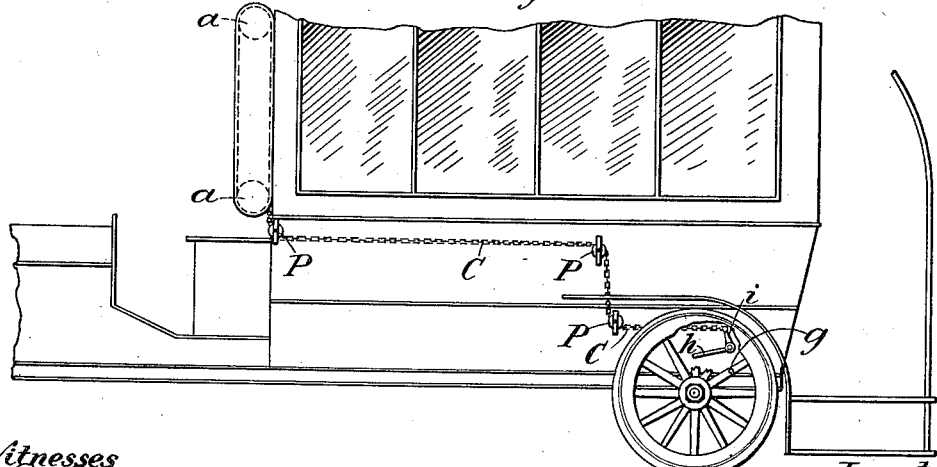
Witnesses
E. L. Corcoran
Harry J. Corcoran
Inventor:
Arthur G. France,
by Herbert W. Jenner
attorney.

UNITED STATES PATENT OFFICE.

ARTHUR GRAHAM FRANCE, OF LONDON, ENGLAND.

ADVERTISING DEVICE.

1,008,594.  Specification of Letters Patent.  Patented Nov. 14, 1911.

Application filed December 17, 1910. Serial No. 597,846.

*To all whom it may concern:*

Be it known that I, ARTHUR GRAHAM FRANCE, residing at 4 Wool Exchange, Basinghall street, London, E. C., England, have invented certain new and useful Improvements in or Connected With Advertising Devices; and I do hereby declare the following to be a full, clear, and exact description of the invention, such as will enable others skilled in the art to which it appertains to make and use the same.

This invention relates to an improvement in advertising devices wherein the device comprises a moving part or parts designed to be operated by suitable motive power which may be obtained from a suitable motor or the like or which power may be obtained, where the advertisement is carried upon a road or moving vehicle, from one of the running wheels or from two or more of such wheels, the object of the present invention being an improved method of and means for transmitting the power from its source to the advertising device, with the object of facilitating the placing of the advertisement in any desired position and providing simple, reliable and efficient means for transmitting the power, the said invention being particularly applicable to advertising devices of the known type wherein the advertisements are carried upon an endless blind or screen passing over rollers or upon the sides or facets of drums or the like which are designed to be periodically rotated for bringing the advertisements into view one after the other.

The invention further consists in providing an improved form of operating and controlling or escapement mechanism, whereby the turning movement of the blind or screen or drum is controlled and furthermore provides an improved method of and means for transmitting motive power for driving the same from its source to the operating and controlling mechanism.

In order that this invention may be fully understood it will now be described with reference to the accompanying drawings which illustrate only so much of the invention as is necessary to facilitate the understanding of the same, and in which:—

Figure 1 is a partial side elevation of a bus, showing the invention in one of its forms applied thereto. Fig. 2 is a front view of the advertising device in one of its forms. Fig. 3 is a detailed front view to an enlarged scale of the drum controlling mechanism. Fig. 4 is a horizontal section partially in elevation of the operating and controlling mechanism. Fig. 5 is a section on line A A of Fig. 4. Fig. 6 is a section on line B B of Fig. 4. Fig. 7 is a partial side elevation of a bus showing a modified form of the invention.

In carrying this invention into practical effect, the advertisements may be carried upon an endless band or bands, chains, or the like, passing over drums, or pulleys, wheels or the like, such as $a$ mounted upon two shafts such as $b$ and a rotatory motion is periodically imparted to one of the members for causing the advertisements to appear one after the other through a suitable opening or transparent surface, substantially in the manner hereinafter set forth.

In order to rotate the advertisements, a spring drum is provided which is normally locked and which, when released is designed to rotate one of the members over which the advertisements pass.

In order that the spring $c$ (Figs. 4 to 6) may be wound up as required, one end of the latter is suitably secured to the spindle of a ratchet wheel $d$, the said wheel being preferably rotated by a spring lifted pivoted arm or lever $e$ which rotates the said ratchet wheel through the space of one or more teeth according to the extent to which its free end is depressed, by means of a pawl $f$ engaging therewith, and for operating this arm or lever it is preferred to mount upon a suitable part of one of the running wheels of the vehicle a projecting stud, arm, or "wiper" $g$ (Fig. 1) designed at each revolution of the running wheel, to strike one arm $h$ of a suitably pivoted bell-crank lever $i$ the movement of which is utilized for depressing the aforesaid operating arm or lever, through the medium of a suitable flexible connection $j$ such as a "Bowden" wire or the like, thereby imparting a turning movement to the ratchet wheel $d$ and winding up the spring $c$.

In order to normally prevent the spring drum turning a reciprocating rod $k$ is provided, formed with studs or stops $l$ one at each side, designed to engage a corresponding projecting part $o$ of the drum or member to be rotated, while, in connection with the ratchet wheel, a cam $m$, is formed or arranged, designed at each half revolution to come into contact with one of two rollers $n$ carried by the aforesaid reciprocating rod, thereby sliding it from one side to the other and allowing the spring drum to make half a revolution, when it is engaged by the stop or catch at the opposite side, while upon a further half revolution of the ratchet wheel being completed, the reciprocating rod is pressed back by the aforesaid cam and the spring drum allowed to make a second half turn and in the manner described the spring drum is wound up and released twice to each revolution of the aforesaid ratchet wheel.

The advertisements may be arranged in any convenient or suitable position or positions upon the vehicle and they may be suitably illuminated if required, while the mechanism for winding up and periodically releasing the spring actuating drum, may be applied to rotary or moving advertisements carried by a stationary object or vehicle, and in this case the said advertisement may be carried by a drum or cylinder or by drums or cylinders, upon an endless band or bands, or a combination of a drum or cylinder and an endless band or bands and drums or cylinders and an endless band or bands as may be required and any suitable motor may be utilized for turning the same.

In the modified form shown in Fig. 7 the "Bowden" wire is replaced by a suitable flexible connection C passing over pulleys P.

What I claim as my invention and desire to secure by Letters Patent is:—

1. The combination, with a revoluble drum for displaying an advertisement, of a cam, a means including a spring operatively connecting the said cam with the said drum, a slidable rod operated by the said cam and provided with stops, means for guiding the said rod, a pin projecting from the said drum and engaging with the said stops alternately, and driving mechanism for revolving the said cam, said drum being actuated by the spring each time the said pin is released from one stop and stopped when the said pin strikes the other stop.

2. The combination, with a revoluble spring-actuated drum for displaying an advertisement, of a driving shaft secured to one end of the driving spring of the said drum, a ratchet wheel secured on the said shaft, a lever pivoted on the said shaft and provided with a pawl for driving the ratchet wheel, a revoluble driving device provided with a tappet, a pivoted lever arranged in the path of the said tappet, a flexible driving connection between the two said levers, a cam revolving with the said ratchet wheel, a slidable rod operated by the said cam and provided with stops, means for guiding the said rod, and a pin projecting from the said drum and engaging with the said stops alternately.

In testimony whereof I affix my signature, in presence of two witnesses.

ARTHUR GRAHAM FRANCE.

Witnesses:
CHAS. LEASON,
THOS. HYDES.

Copies of this patent may be obtained for five cents each, by addressing the "Commissioner of Patents, Washington, D. C."